United States Patent Office 3,549,706
Patented Dec. 22, 1970

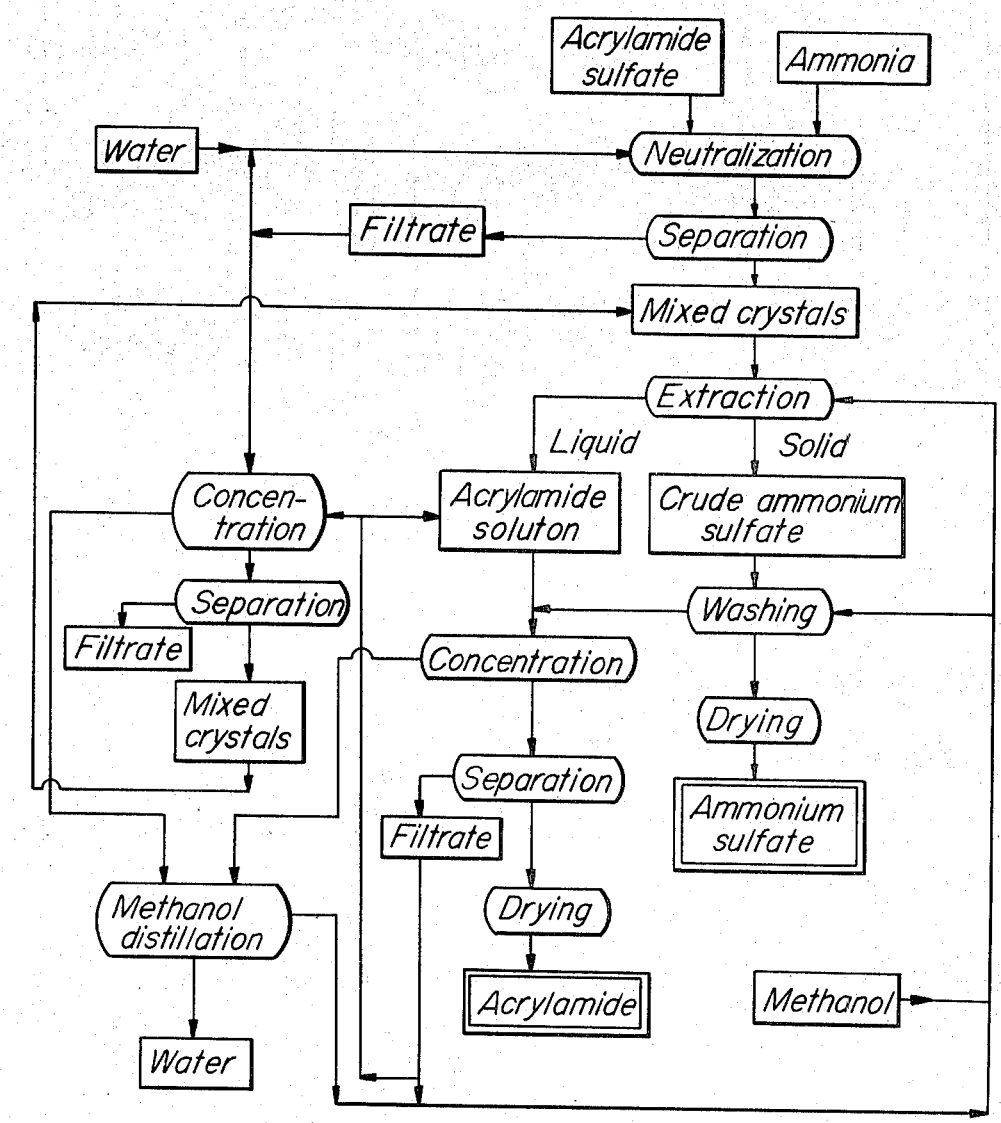

3,549,706
PROCESS FOR SEPARATING ACRYLAMIDE
Takumi Takaki, Kazumi Takagi, Akira Hisada, and Tamio Tsunokawa, Niihama-shi, Japan, assignors to Sumitomo Chemical Company, Ltd., Osaka, Japan, a corporation of Japan
Continuation-in-part of application Ser. No. 523,334, Jan. 27, 1966. This application July 17, 1969, Ser. No. 842,572
Claims priority, application Japan, Feb. 1, 1965, 40/5,616
Int. Cl. C07c *103/12*
U.S. Cl. 260—561                            1 Claim

ABSTRACT OF THE DISCLOSURE

A highly pure form of acrylamide and ammonium sulfate can be obtained by neutralizing acrylamide sulfate with ammonia in a medium of an aqueous solution containing acrylamide and ammonium sulfate to obtain upon cooling during and/or after the neutralization acrylamide-ammonium sulfate mixed crystals, which contain large size ammonium sulfate crystals, and separating out the acrylamide by methanol extraction.

---

This application is continuation-in-part of U.S. application Ser. No. 523,334 filed on Jan. 27, 1966, now abandoned.

The present invention relates to a process for separating acrylamide from acrylamide sulfate. More particularly it relates to neutralization of acrylamide sulfate with ammonia and extracting of acrylamide from the thus resulting acrylamide-ammonium sulfate mixture. In the present invention acrylamide sulfate is acrylamide sulfuric acid salt.

Acrylamide is commercially produced by hydrolyzing acrylonitrile with sulfuric acid monohydrate to yield acrylamide sulfate and neutralizing the resulting acrylamide sulfate and then separating acrylamide thus liberated.

These neutralization and separation processes suffer from numerous difficulties. Various processes have been suggested for overcoming the difficulties, but none of these processes have been satisfactory. For example, a process was proposed, wherein acrylamide sulfate was neutralized with ammonia in isopropanol or methanol as a neutralization medium. The proceeding of neutralization reaction was slow and imperfect, although this process may be theoretically considered to facilitate the separation of acrylamide and ammonium sulfate. If severe reaction conditions are employed to increase the rate of the neutralization reaction and to make the neutralization substantially complete, many side reactions will occur. The process prior art had also another disadvantage in that the grain size of byproduct ammonium sulfate was so fine that this byproduct was difficult to separate and that the purity of this byproduct was poor. Also, another process was proposed, wherein water was employed as a neutralization medium and acrylamide and ammonium sulfate were separated from a neutralized liquid utilizing the fact that the temperature characteristic of the solubility of acrylamide in a neutralized liquid is contrary to that of ammonium sulfate. The process did not suffer from the above-mentioned problem in the neutralization stage, but required the adjustment of the concentration in water and was liable to be accompanied with the formation of acrylic acid. Also, in that process, the contamination of acrylamide with an acrylamide polymer and the contamination of ammonium sulfate with acrylamide were unavoidable. Other process has been suggested to overcome these disadvantages, wherein the neutralization of acrylamide sulfate was carried out in a water-alcohol mixture medium containing 8 to 45 percent by weight of water, and ammonium sulfate and acrylamide were then recovered from the neutralized liquid. The process had disadvantages in that the rate of neutralization was low and a large amount of refrigerant was required to crystallize the acrylamide.

The present inventors have made various studies and as a result they have now found that, when acrylamide sulfate is neutralized with ammonia in a medium of an aqueous solution containing acrylamide and ammonium sulfate, the neutralization rate is not low and the formation of acrylic acid or the like is little and the resultant acrylamide-ammonium sulfate mixed crystals obtained, if desired, by cooling, which may be referred to later only as mixed crystals, contain large sized ammonium sulfate crystals and can be separated with little adhesion of neutralization mother liquor and that when said mixed crystals are subjected to extraction, highly pure acrylamide is separated in methanol solution from ammonium sulfate.

One object of the present invention is to provide a process for economically separating highly pure acrylamide from acrylamide sulfate.

Further objects will be apparent from the following description.

In order to accomplish these objects the present invention provides a process for separating acrylamide from acrylamide sulfate, which comprises neutralizing acrylamide sulfate with ammonia, the neutralization being conducted in a neutralization medium of neutralization mother liquor obtained from the previous neutralization process and a balanced amount of water; cooling, during and/or after the neutralization, the resultant mixture to crystallize acrylamide and ammonium sulfate; filtering the resultant mixture to separate mixed crystals of acrylamide and ammonium sulfate; contacting said mixed crystals with methanol to extract acrylamide in a methanol solution from ammonium sulfate; concentrating the methanol extract to crystallize acrylamide; filtering the concentrate to separate acrylamide; and drying the separated acrylamide.

The acrylamide sulfate employed in the process of this invention, is obtained by the hydrolysis of acrylonitrile with sulfuric acid monohydrate.

A polymerization inhibitor is preferably present in the neutralization process. Usually the inhibitor, which is added in the previous hydrolysis reaction of acrylonitrile, may effectively be utilized. As the polymerization inhibitor, any compound which may be employed to prevent the polymerization of acrylamide can be utilized, such as, for example, ferrous sulfate, copper sulfate, sodium nitrite, ammonium salt of N-nitrosophenylhydroxylamine, sodium - 1 - nitroso - 2-hydroxynaphthalene-3,6-disulfonate, phenothiazine and the like.

The appended drawing is a schematic representation of one preferable system suitable for carrying out the process according to the present invention.

The present invention will be hereunder explained in detail referring to the drawing.

To the neutralization mother liquor or the neutralization reaction system a balanced amount of water is added. Said balanced amount of water corresponds to loss of water in the previous neutralization process. Neutralization medium which is total of neutralization mother liquor obtained in the previous neutralization process and a balanced amount of water is employed in an amount of 15–2400 percent by weight, preferably 100–600 percent by weight of acrylamide sulfate. Within this range the neutralization reaction may smoothly proceed and the resultant acrylamide and ammonium sulfate may be easily filtered and advantageously separated.

Ammonia is usually supplied in the form of gas, but it may be in the form of liquid. The supply of ammonia is carried out so that pH of the neutralization medium is 5.0 to 8.0, and preferably 6.0 to 7.0. If the pH of the medium exceeds 8.0, much side reactions disadvantageously may occur.

The neutralization temperature is not higher than 60° C., and preferably in a range of 10° to 50° C. According to the present invention, mixed crystals of acrylamide and ammonium sulfate are separated, and thus a temperature capable of depositing the acrylamide can be selected at the neutralization. That is, the neutralization temperature may be lowered to about 20 to 35° C. As a result, formation of impurities can be suppressed, which results in obtaining highly pure acrylamide and ammonium sulfate. In the mixture thus neutralized, large sized ammonium sulfate crystallizes out. If desired, in order to crystallize more acrylamide, the mixture is cooled to −10° to 40° C., preferably −10° to 20° C., and this cooling temperature range may be attained during the neutralization.

The neutralized mixture containing crystals of acrylamide and ammonium sulfate is then subjected to filtration, whereby the mixed crystals are separated from the neutralization mother liquor. The mixed crystals consist essentially of acrylamide and ammonium sulfate, and a ratio by weight of ammonium sulfate to acrylamide is 1–3:1, usually about 2:1.

Acrylamide is generally hard to separate from the neutralization mother liquor, and the separated acrylamide usually contains a large amount of neutralization mother liquor. On the other hand, in the present invention, the ammonium sulfate crystals coexisting in the neutralized mixture act as a filtration aid for the separation of the acrylamide from the neutralization mother liquor, and the acrylamide is much readily separated from the neutralization mother liquor as mixed crystals. Therefore, the amount of neutralization mother liquor adhering to the mixed crystals is very small, for example, usually 2–4% by weight on the basis of the mixed crystals. This fact greatly contributes in the present invention to obtaining acrylamide having less impurities.

The filtered mixed crystals are transferred to the methanol extraction process. On the other hand a greater part, that is, 80 to 95 weight percent, of the filtrate, the neutralization mother liquor, is recycled for use as said neutralization medium and the remainder is subjected to a concentration process. The purpose of subjecting the remainder, which is a minor part of the filtrate, to the concentration process is to prevent the accumulation of impurities, which may be slightly formed in the neutralization process or any previous processes, even if a polymerization inhibitor has been added to the reaction system.

The extraction is carried out at a temperature of 20° to 50° C. employing methanol in an amount of 50 to 200 weight percent of the weight of acrylamide entering into extraction process. As methanol for extraction, a mixture of fresh methanol and recovered methanol described later may be usually employed. As the methanol extract contains not more than 0.25 part by weight of water per one part of methanol, ammonium sulfate is hardly soluble in the extract and the impurities, which may get mixed in the extraction process only in a small amount, is also insoluble in the extract. Therefore, highly pure acrylamide may be advantageously recovered from this extract.

After the methanol extraction, the mixture is separated into solid crude ammonium sulfate and a solution of acrylamide in methanol by a filtration operation. The solution of acrylamide in methanol is then subjected to a concentration process to recover acrylamide. The concentration is carried out by evaporating methanol at a temperature not higher than 50° C. and preferably 20° C. to 40° C., and the concentration may be preferably performed at a reduced pressure of from 20 mm. Hg to 80 mm. Hg. The concentration is first carried out until about 60 weight percent of dissolved acrylamide is crystallized. The crystallized acrylamide is filtered and dried to yield a product. The resultant acrylamide has a purity of from 99.0 percent to 99.8 percent.

After acrylamide is separated by filtration, 70 weight percent to 95 weight percent of the filtrate is returned to the acrylamide solution obtained after the extraction process and the remainder, 30 weight percent to 5 weight percent, is introduced into another concentration process in order to remove a balanced amount of water corresponding to the amount of water introduced into the extraction process being accompanied with the mixed crystals and to remove any impurities which may be brought in said filtrate in the processes of and after the extraction. This concentration is carried out after said part of the filtrate is combined with a part of the said neutralization mother liquor in order to simultaneously remove any impurities which tend to form and accumulate in the neutralization mother liquor. The concentration is usually carried out until the amount of the liquid is about one half, when ammonium sulfate and acrylamide is crystallized. These crystallized products are separated by filtration. The resultant mixed crystals are introduced into said methanol extraction process to recover ammonium sulfate and acrylamide. The filtrate contains said impurities, which tend to form and accumulate in the processes after the neutralization, mainly an acrylamide polymer, in a small amount but a more concentrated state, in addition to acrylamide and ammonium sulfate, so that the filtrate is removed from the system. Here the loss of acrylamide is little and not more than 3.5 mol percent based upon the acrylamide sulfate.

On the other hand the methanol containing vapor discharged from this concentration process and the acrylamide-methanol solution concentration process is distilled to recover methanol. After the recovered methanol is replenished with an amount of fresh methanol corresponding to the loss, a greater part of the methanol is circulated to said extraction process and the remainder is employed to wash said crude ammonium sulfate. The crude ammonium sulfate is washed with 0.05 to 0.2 part by weight of methanol per one part of ammonium sulfate. A small amount of acrylamide remaining with said crude ammonium sulfate may be perfectly removed by this washing. The washed ammonium sulfate is filtered and dried to yield a product. The product has a purity of 99.5–99.8%.

The acrylamide obtained by the process of the present invention is highly pure free from such impurities as ammonium sulfate, an acrylamide polymer and the like. Therefore the product may be employed without difficulty in general application of acrylamide, particularly soil reformation for water-tight engineering works, paper reinforcement, textile processing and the like. Also the byproduct, ammonium sulfate is highly pure and may be employed as a fertilizer, since it does substantially not contain acrylamide. In the process of the present invention, the neutralization of acrylamide sulfate may be smoothly accomplished and little side reactions may occur, so that acrylamide and ammonium sulfate may be recovered at a high yield as a whole and the consumption of methanol may be a little. The process according to the present invention is, therefore, an economical process.

The following example only illustrates the present invention and it is not intended to limit the invention to the example.

EXAMPLE

Acrylamide sulfate was prepared by adding 146 grams of acrylonitrile to a mixture of 290 grams of 98% sulfuric acid and 47 grams of water containing ferrous sulfate as a polymerization inhibitor and heating at 90° C. The resulting acrylamide sulfate was dissolved in 1760 grams of neutralization mother liquor obtained by the previous neutralization and consisting of 7.5 weight percent of acrylamide, 30 weight percent of ammonium sulfate and 60 weight percent of water, and 150 grams of water was then added thereto. Thereafter the solution was neutralized until the pH of the solution reached 6.5 by blowing ammonia gas into the solution at 40° C. The resultant neutralized mixture was cooled to 5° C. and filtered to separate mixed crystals thus formed. 1760 grams of the filtrate was recycled for use as a neutralization medium to the neutralization process, as described above, while the remainder was transferred to the concentration process. The separated mixed crystals were introduced into an extraction vessel together with the recovered mixed crystals described later, where acrylamide was extracted with methanol at 30° C. by contacting the mixed crystals with 270 grams of recovered methanol. After the extraction treatment, the mixture was filtered at 10° C. to separate crude ammonium sulfate from the methanol extract.

The crude ammonium sulfate was washed with 32 grams of recovered methanol and dried to yield 363 grams of ammonium sulfate product. The product has a purity of 99.7 percent and contained 0.05 weight percent of acrylamide. When the product was applied to soil as a fertilizer, it gave no harmful effect to plants.

The methanol extract was combined with 190 grams of the acrylamide methanol solution obtained after separating acrylamide crystals and then combined with methanol, with which crude ammonium sulfate had been washed. Thus the composition consisted of about 40 weight percent of acrylamide, about 57 weight percent of methanol and about 3 weight percent of water. The solution was concentrated at 30° C. and at a reduced pressure of 20 mm. Hg. The crystallized acrylamide was filtered and dried to yield 172 grams of acrylamide product. The product had a purity of 99.7 percent and did not substantially contain acrylic acid and an acrylamide polymer. The product was in the form of snow white needle crystals containing a very small amount (0.01 wt.%) of ammonium sulfate.

190 grams of the filtrate obtained after separating acrylamide crystals were returned to the above-mentioned methanol extract, and the remainder was combined with a part of the filtrate from said neutralized mixture, which had not been circulated to the neutralization process, and the mixture solution was concentrated at 35° C. and at a reduced pressure of 40 mm. Hg, and then cooled to 5° C. The mixed crystals thus crystallized were recovered by filtration and introduced into said extraction process. The filtrate, consisting of 7.8 weight percent of acrylamide, 30.2 weight percent of ammonium sulfate and 58.4 weight percent of water, were removed from the system. The loss of acrylamide was 2.8 mol percent of acrylamide sulfate, which constituted a greater part of the total loss of acrylamide. The methanol containing vapor discharged from the above concentration process and the acrylamide-methanol solution concentration process was distilled to recover methanol, which was recycled as described above.

We claim:
1. A process for separating acrylamide from acrylamide sulfate which comprises:
   (1) neutralizing acrylamide sulfate with ammonia in an amount of 15 to 2400% by weight of acrylamide sulfate of an aqueous solution containing acrylamide and ammonium sulfate at a temperature of 10° to 50° C.,
   (2) without any significant prior separation of ammonium sulfate keeping the resultant neutralized mixture at −10° C. to 40° C. to crystallize a mixture of crystals of acrylamide and ammonium sulfate,
   (3) filtering the resultant mixture to separate mixed crystals of acrylamide and ammonium sulfate from neutralization mother liquor, the weight ratio of the acrylamide crystals to ammonium sulfate crystals being 1:1–3,
   (4) recycling the greater part of the resultant mother liquor of step (3) to step (1) together with freshly added water added to make up the amount of water removed from the neutralization system, and introducing the remainder of the mother liquid to a concentrating zone,
   (5) contacting mixed crystals of step (3) with methanol to extract acrylamide as a methanol solution from the remaining ammonium sulfate crystals,
   (6) concentrating the methanol solution from step (5) by evaporating methanol to crystallize acrylamide.
   (7) filtering the resultant concentrate of step (6) to separate acrylamide from the remaining filtrate,
   (8) drying the separated acrylamide of step (7) to obtain product acrylamide,
   (9) recycling a part of the filtrate of step (7) to step (6) and concentrating it, and introducing the remainder of the filtrate of step (7) to the concentrating zone of step (4),
   (10) concentrating the mother liquor and the filtrate introduced into the concentrating zone in step (4) by evaporating methanol to crystallize acrylamide and ammonium sulfate,
   (11) filtering the resultant mixture of step (10) to separate mixed crystals from a filtrate,
   (12) returning the mixed crystals of step (11) to step (5) and contacting them with methanol,
   (13) removing said filtrate of step (11) from the system,
   (14) returning the greater part of methanol evaporated in step (6) and step (10) to step (5) after condensing the methanol,
   (15) washing ammonium sulfate crystals obtained from step (5) with the remaining part of the evaporated methanol after condensing the methanol,
   (16) separating and drying the washed ammonium sulfate of step (15) to obtain product ammonium sulfate, and
   (17) passing the methanol utilized in step (15) after washing the ammonium sulfate crystals to step (6) to concentrate it.

References Cited

UNITED STATES PATENTS

| 2,753,375 | 4/1956 | Webb et al. | 260—561 |
| 2,771,490 | 11/1956 | Stoddard et al. | 260—561 |
| 3,008,990 | 11/1961 | Weiss | 260—561 |
| 3,324,180 | 6/1967 | Beer et al. | 260—561 |

FOREIGN PATENTS

| 897,209 | 5/1962 | Britain | 260—561 |

ALEX MAZEL, Primary Examiner

R. V. RUSH, Assistant Examiner